US006052909A

United States Patent [19]

Gardner

[11] Patent Number: 6,052,909

[45] Date of Patent: Apr. 25, 2000

[54] HAND-HELD OVAL CUTTING DEVICE

[76] Inventor: Mark T. Gardner, 316 Briarbrook Dr., Carl Junction, Mo. 64834

[21] Appl. No.: 09/140,264

[22] Filed: Aug. 26, 1998

[51] Int. Cl.[7] ............................ B23L 11/04; B26B 3/00

[52] U.S. Cl. ............................ 30/310; 30/300; 33/31

[58] Field of Search ............................ 30/300, 310; 33/31, 33/30.1, 30.6; 83/879

[56] References Cited

U.S. PATENT DOCUMENTS

| | | | |
|---|---|---|---|
| D. 243,117 | 1/1977 | Green . | |
| 658,710 | 9/1900 | Forker . | |
| 697,997 | 4/1902 | Drinkaus . | |
| 1,007,910 | 11/1911 | Baker . | |
| 3,562,915 | 2/1971 | Brown | 33/31 |
| 3,621,574 | 11/1971 | Yanke et al. . | |
| 3,834,028 | 9/1974 | Okada et al. . | |
| 4,112,793 | 9/1978 | Pierce . | |
| 4,244,106 | 1/1981 | Pierce . | |
| 4,567,927 | 2/1986 | Plamann . | |
| 5,058,282 | 10/1991 | Coll . | |
| 5,099,727 | 3/1992 | Kozyrski et al. . | |
| 5,189,800 | 3/1993 | Morita et al. . | |
| 5,233,748 | 8/1993 | Logan et al. . | |
| 5,526,573 | 6/1996 | Peters et al. . | |

*Primary Examiner*—Douglas D. Watts
*Attorney, Agent, or Firm*—Martin & Associates, L.L.C.; Derek P. Martin

[57] ABSTRACT

A cutting device is operable with one hand for cutting an elliptical shape in a sheet of material. The cutting device includes an elliptically-shaped base plate for placement on the sheet material and a cutting member for simultaneous pivotal and translatable movement with respect to the base plate. The base plate has a first pivot point that is movable along a first axis, while the cutting member has a second pivot point that is movable along a second axis substantially perpendicular to the first axis. The base plate and cutting member are operably connected to each other at the first and second pivot points. A knob is connected to one of pivot points and is sized to be grasped by one hand and rotated. Rotation of the knob about the one pivot point causes the cutting member to rotate and slide in an elliptical pattern with respect to the base plate to thereby cut an elliptical shape in the sheet of material.

30 Claims, 7 Drawing Sheets

HAND-HELD OVAL CUTTING DEVICE

BACKGROUND OF THE INVENTION

1. Field of the Invention

This invention relates to cutting devices, and more particularly to a device for cutting ovals of variable sizes in photographs, sheets, mats, and the like.

2. Description of the Related Art

Many prior art elliptical cutting devices are primarily designed to cut out an oval shape in a cardboard mat or the like, where the oval area of the mat is usually discarded after the cut. Such devices are typically hand-held and include one or more pins that pierce the oval area for securing a base portion of the device against movement with respect to the mat during cutting. This type of arrangement is disadvantageous where it is desirous to keep and display the oval cut-out, which may include interesting subject matter captured on photographic paper, etc.

Prior art hand-held elliptical cutting devices also typically include a large number of moving parts that require two-hand manipulation. During the course of a cutting operation, one of the arms and/or hands of the user will invariably block another of the arms and/or hands since one hand is usually held stationary while the other hand moves in an elliptical pattern. This type of interference can produce results that are below expectations since the cutting operation must be stopped, the moving hand repositioned under the interfering arm, and the cutting operation restarted. Many variables are introduced into the cutting operation during hand repositioning, such as uneven or inconsistent pressure applied to the cutting device from one or both hands, leaning or inadvertent moving of the device, etc. Thus, these types of devices are difficult to manipulate and maintain accurate and consistent cuts.

SUMMARY OF THE INVENTION

These and other problems of the prior art are overcome by the provision of a hand-held device that is operable with one hand for forming an elliptical shape in a sheet of material.

According to the invention, the hand-held device comprises a first member adapted for placement on the sheet material. The first member has a first pivot point that is movable along a first axis. A second member has a second pivot point that is movable along a second axis, preferably substantially perpendicular to the first axis. The first and said second members are operably connected to each other at the first and second pivot points. A knob is connected to one of the first and second pivot points, the knob being adapted for grasping by a user such that rotation of the knob about the one pivot point causes the second member to rotate and slide in an elliptical pattern with respect to the first member.

According to a further embodiment of the invention, a hand-held device for forming an elliptical shape in a sheet of material comprises a first plate member adapted for placement on the sheet material. The first plate member has a first pivot point that is movable along a first axis. A second plate member has a second pivot point that is preferably movable along a second axis substantially perpendicular to the first axis. The first and second plate members are operably connected to each other at the first and second pivot points. A forming member is operably connected to the second plate member for forming the elliptical shape in the sheet of material. The forming member may be a writing implement, scribing tool, cutting device, or the like. With this arrangement, rotation of the second plate member with respect to the first plate member about the movable pivot points causes the forming member to move in an elliptical path.

A knob may be connected to one of the first and second pivot points. The knob is adapted for grasping and rotation by a user. Rotation of the knob about the one pivot point causes the forming member to move in the elliptical path.

According to an even further embodiment of the invention, a hand-held device for cutting an elliptical shape in a sheet of material comprises an elliptical base plate having major and minor axes. The base plate includes upper and lower surfaces with an elongate slot extending along one of the axes between the upper and lower surfaces. A channel is formed in the upper surface and extends along the other of the axes. A plurality of resilient feet are attached to the lower surface of the base plate for contacting the sheet of material. An adjusting plate has upper and lower surfaces with an elongate slot extending therebetween. The lower surface of the adjusting plate comprises at least one linear matrix of bores that extends generally parallel to the elongate slot of the adjusting plate.

A spacer block is located between the base plate and the adjusting plate. The spacer block includes a registration pin that projects from an upper surface thereof for reception into one of the bores when the plates and block are connected together.

An elongate fastener has a head portion and a shaft portion, with the shaft portion extending through the slot in the base plate, an aperture in the spacer block and the slot in the adjusting plate. Preferably, the head portion of the fastener is adjacent the base plate lower surface. A knob is threaded onto a distal end of the shaft portion for holding the base plate, spacer block and adjusting plate together. The adjusting plate and spacer block are rotatable about a first movable pivot point defined by a longitudinal axis of the elongate fastener. The adjusting plate together with the spacer, elongate fastener and knob are also translatable along the slot in the base plate.

A slider block is located in the channel of the base plate and is pivotally attached to the spacer block to define a second movable pivot point that is translatable along the channel.

A blade holder is connected to an outer end portion of the adjusting plate for receiving a cutting blade. The blade holder has a lower end portion with a depression formed therein. Preferably, the depression is shaped to receive a substantial portion of the cutting blade, with a depth of the depression being at least equal to a thickness of the cutting blade. First and second fasteners are mounted to the holder. Each of the fasteners has a head portion. The head portion of the first fastener is partially located in the depression such that a space for the cutting blade is formed between the head portion and a bottom surface of the depression. The head portion of the second fastener is entirely located in the depression such that the cutting blade can be securely held between the head portion of the second fastener and the bottom surface of the depression.

The knob is of sufficient size to be grasped by the hand of a user and rotated about the elongate fastener. Rotation of the knob causes the adjusting plate to rotate about and translate with the first and second pivot points to thereby move the cutting blade along the elliptical path. The size of the elliptical path is adjustable by positioning at least one registration pin in a selected bore of the matrix of bores.

BRIEF DESCRIPTION OF THE DRAWINGS

The preferred embodiments of the present invention will hereinafter be described in conjunction with the appended drawings, wherein like designations denote like elements, and.

DETAILED DESCRIPTION OF THE PREFERRED EMBODIMENTS

Figure 1:
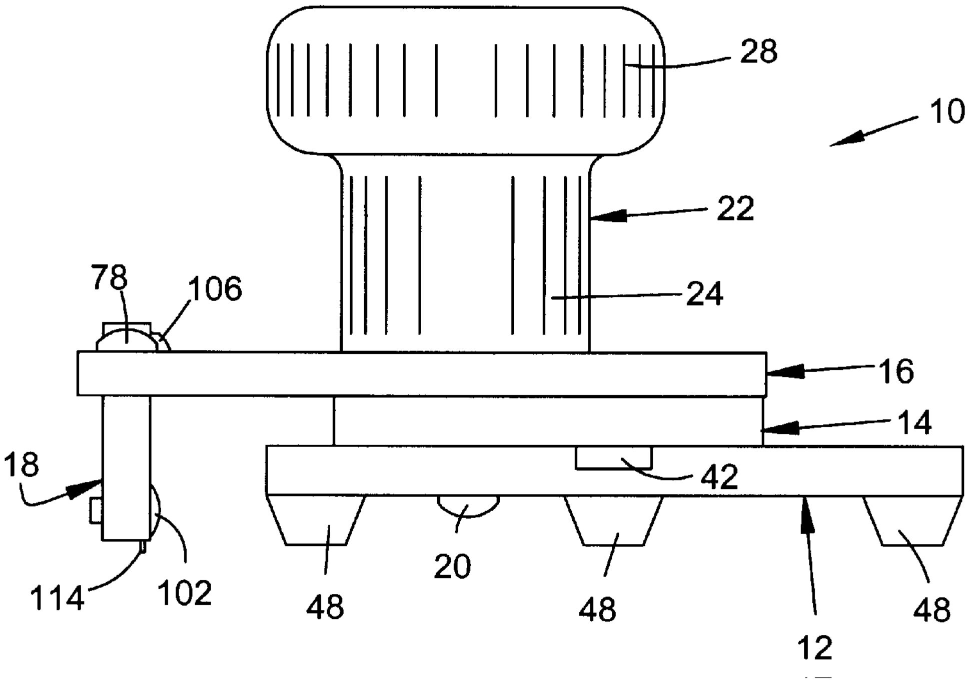
FIG. 1 is a side elevational view of a hand-held oval cutting device according to the invention.
Figure 2:
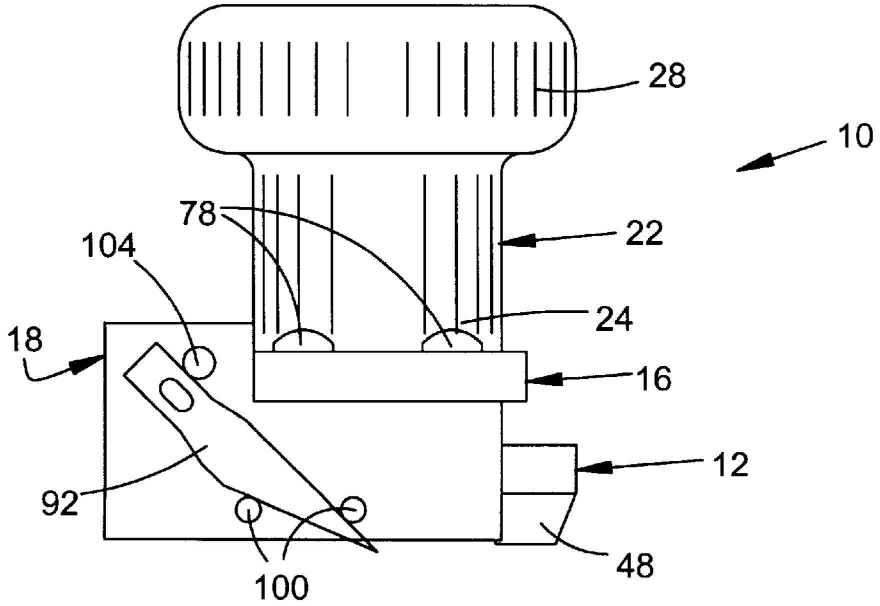
FIG. 2 is a rear elevational view of the hand-held oval cutting device.
Figure 3:
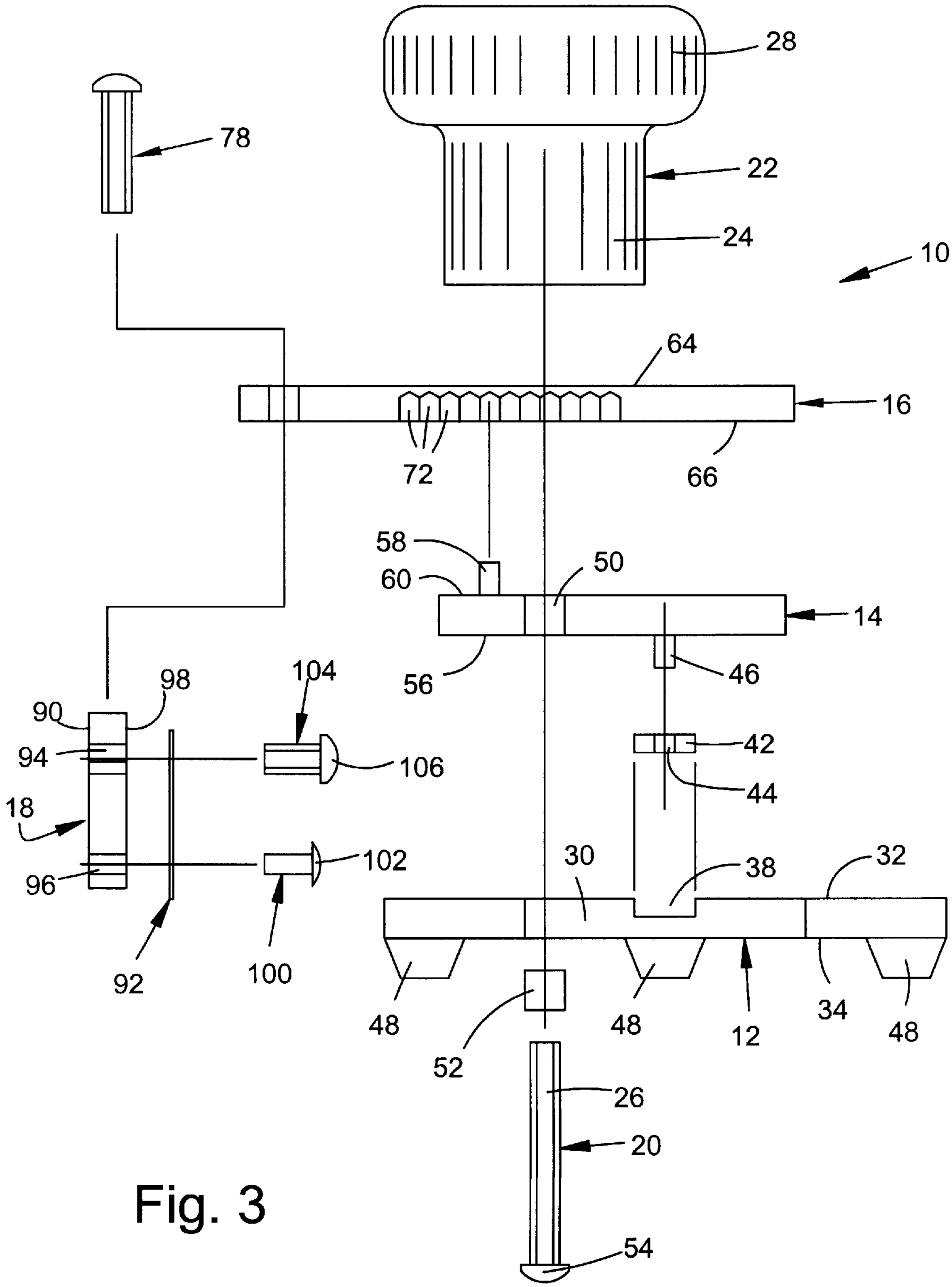
FIG. 3 is an exploded side view of the hand-held oval cutting device.

Referring now to the drawings, and to FIGS. 1–3 in particular, a hand-held oval cutting device 10 comprises a base plate 12 pivotally connected to a spacer block 14 and an adjusting plate 16, with a blade holder 18 fixedly connected to the adjusting plate 16. An elongate machine screw 20 or other suitable fastener has a head portion 54 and a threaded shaft portion 26. The shaft portion 26 extends through the base plate 12, the spacer block 14, and the adjusting plate 16. A knob 22 includes a lower stem portion 24 that receives an upper end portion of the threaded shaft 26 for holding the base plate, spacer block, and adjusting plate together. An upper handle portion 28 of the knob 22 is adapted to be grasped and manipulated by one hand of a user.

Figure 4:
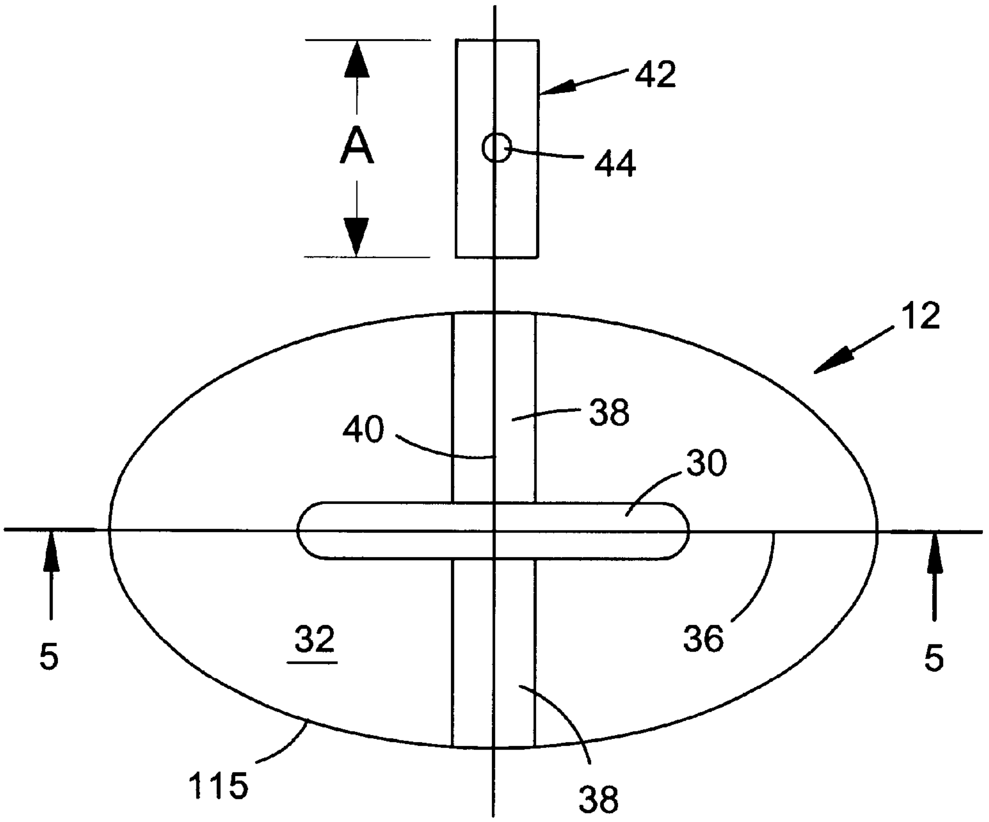
FIG. 4 is a top plan view of a base plate and slider block according to the invention.
Figure 5:
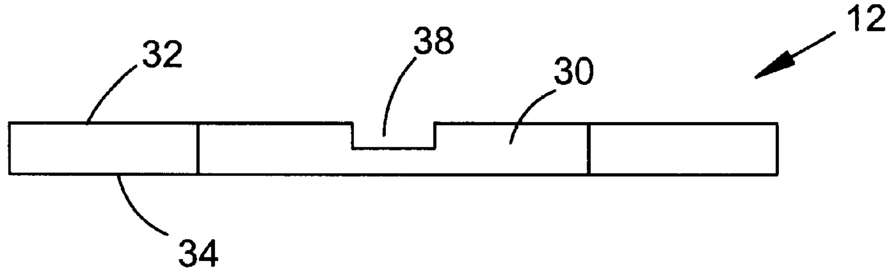
FIG. 5 is a cross sectional view of the base plate taken along line 5—5 of FIG. 4.

As shown in FIGS. 4 and 5, the base plate 12 is preferably elliptical in shape. A slot 30 extends through the base plate 12 from an upper surface 32 to a lower surface 34 thereof. The slot 30 preferably lies along a major axis 36 of the ellipsoid. A channel 38 is formed in the upper surface 32 of the base plate 12 and preferably extends along a minor axis 40 of the ellipsoid, intersecting the slot 30.

A slider block 42 is dimensioned to be slidably received in the channel 38 with a length "A" that is preferably longer than a width of the slot 30. An opening 44 extends through the slider block 42 and is adapted to pivotally receive a pivot pin 46 (FIG. 3) that projects downwardly from the spacer block 14.

As shown in FIG. 3, a plurality of resilient feet 48 are attached to the lower surface 34 of the base plate 12, preferably through an adhesive layer, but may alternatively be attached by suitable fasteners, ultrasonic welding, or other well-known means. The resilient feet are arranged so as to firmly grip the surface of a sheet material during cutting As used herein, the terms "forward," "rearward," "upper," and "lower" and other directional terms are indicative of relative, not absolute orientations or positions. Preferably, the cutting device is constructed of clear plastic material, with the exception of the knob 22 which may be constructed of nylon or the like.

Figure 8:
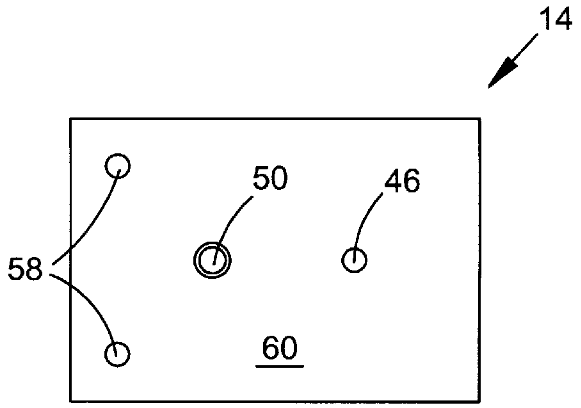
FIG. 8 is a top plan view of a spacer block according to the invention.

With additional reference to FIG. 8, the spacer block 14 includes a threaded aperture 50 that receives the threads of the fastener 20 to mount the block 14 to the base plate 12. A bushing 52 is received in the slot 30 between the head 54 of the fastener 20 and a lower surface 56 of the block 14, and is dimensioned to slide freely in the slot 30. The shaft 26 of the fastener 20 extends through the bushing 52. Preferably, the height of the bushing is slightly greater than the thickness of the base plate 12 such that the head 54 is slightly spaced from the lower surface 34 of the base plate to minimize friction during pivoting and sliding movements of the adjusting plate and spacer block with respect to the base plate.

The pivot pin 46 is preferably installed in an aperture formed in the spacer block 14 through press fitting or other well-known means, and projects downwardly from the lower surface 56. As described previously, the pivot pin 46 extends through the slider block 42 and constrains movement of the slider block within the channel 38 when the spacer block is rotated with respect to the base plate.

Two registration pins 58 project upwardly from an upper surface 60 of the spacer block 14 for a purpose to be described in greater detail below. As with the pivot pin 46, the registration pins 58 are preferably installed in apertures formed in the spacer block 14 through press fitting.

Figure 6:
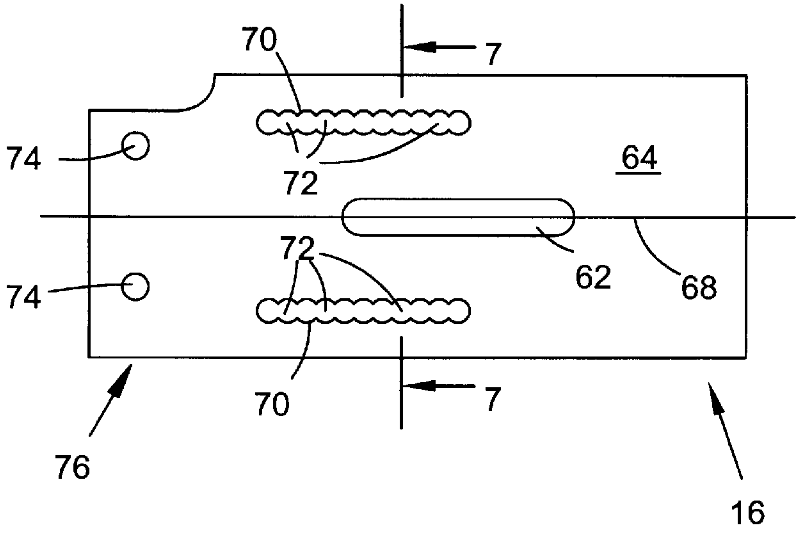
FIG. 6 is a top plan view of an adjusting plate according to the invention.
Figure 7:
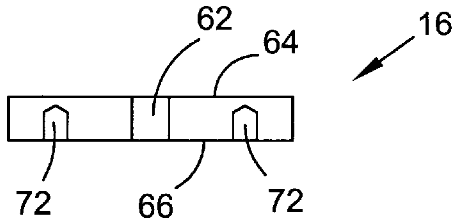
FIG. 7 is a cross sectional view of the adjusting plate taken along line 7—7 of FIG. 6.

With reference now to FIGS. 6 and 7, a slot 62 extends through the adjusting plate 16 from an upper surface 64 to a lower surface 66 thereof. The slot 62 preferably lies along a longitudinal axis 68 of the plate 16. A pair of opposing channels 70 is formed in the lower surface 66 of the adjusting plate 16. The channels are preferably formed on either side of the slot 62 and extend parallel therewith. Each channel 70 comprises a linear array of intersecting bores 72, with each bore being sized to receive one of the registration pins 58. Apertures 74 extend through an end portion 76 of the adjusting plate 16 and are sized to receive threaded fasteners 78 (FIG. 3) for securing the blade holder 18 to the lower surface 66 of the adjusting plate 16.

Figure 9:
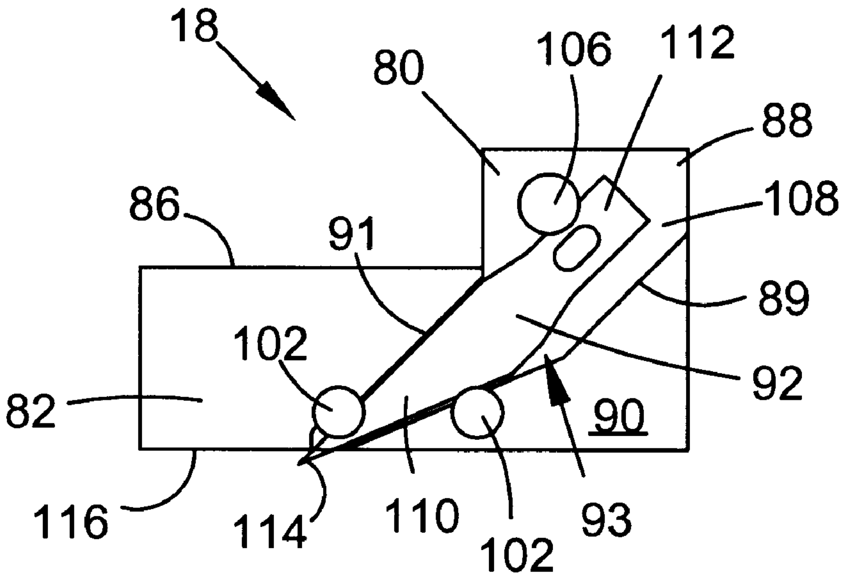
FIG. 9 is an enlarged rear elevational view of a blade holder according to the invention.
Figure 10:
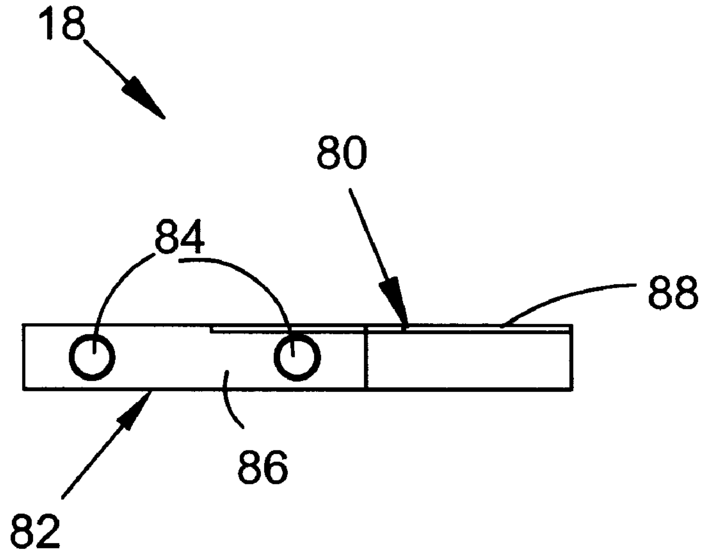
FIG. 10 is a top plan view of the blade holder of FIG. 9.

As shown in FIGS. 9 and 10, the blade holder 18 is preferably L-shaped with a first upright leg 80 and a second leg 82 that extends substantially perpendicular to the first leg. Bores 84 extend downwardly from an upper surface 86 of the second leg 82. When assembled, the bores 84 are in alignment with the apertures 74 of the aligning plate 16, and the fasteners 78 extend through the apertures 74 and thread into the bores 84. A depression 88 is formed in the rear surface 90 of the holder 18. The depression 88 has a lower side wall 89 and an upper side wall 91 that together define a depression area 93. The depression area 93 is shaped to receive a standard razor-type cutting blade 92 (shown in phantom line). Blades manufactured under the trade name X-ACTO™, for example, would be suitable. Preferably, the depth of the depression 88 is greater than or equal to the thickness of the blade 92 in order to shield as much of the blade as possible from a user.

With additional reference to FIG. 3, an upper aperture 94 and a pair of lower apertures 96 extend between the front surface 98 and rear surface 90 of the holder 18. A rivet 100 or other fastener with a head 102 is installed in each of the lower apertures 96 while a threaded fastener 104 with a head 106 is threaded in the upper aperture 94. When the rivets 100 are installed, a portion of each head 102 abuts the rear surface 90 while a remaining portion of each head extends into the depression area 93 to form a space between an inner depression surface 108 and the head 102. In this manner, a cutting end 110 of the blade 92 can be captured between the depression surface 108 and head 102 when installed. Unlike the fasteners 100, the fastener 104 is installed with the head located completely within the depression area 93. A mounting end 112 of the blade 92 can then be firmly held between the head 106 and the depression surface 108. When it is desirous to remove the blade 92 from the holder 18, it is a simple matter to loosen the threaded fastener 104 and slide the blade along the surface 108 until the cutting end 110 of the blade is clear of the heads 102. Installation of the blade can be accomplished in the reverse order. Once installed, a cutting tip 114 of the blade 92 extends a predetermined distance below a lower surface 116 of the holder 18 for cutting materials of a predetermined thickness. It will be understood of course, that the predetermined distance may be adjustable to accommodate different material thickness.

Although it is preferred that the blade holder and blade extend substantially perpendicular from the adjusting member 16 to form a straight cut in a sheet of material, there may be some instances where it is desirous to cut a beveled surface. In this case, the blade holder and/or adjusting member may be modified to position the blade at an acute angle with respect to a surface of the sheet material to be cut.

Referring again to FIGS. 1 and 3, the oval cutting device 10 can be adjusted to cut different sizes of ovals by first loosening the knob 22, lifting the adjusting plate 16 until the registration pins 58 are clear of their respective bores 84, sliding the adjusting plate forward or rearward until the pins 58 are in alignment with a new set of bores, and then retightening the knob 22 with the adjusting plate in the new position. Since the fastener 20 is also threaded into the spacer block 14, the spacer block remains together with the base plate 12, although pivoting and sliding movement between the spacer block and base plate may occur.

Figure 11:
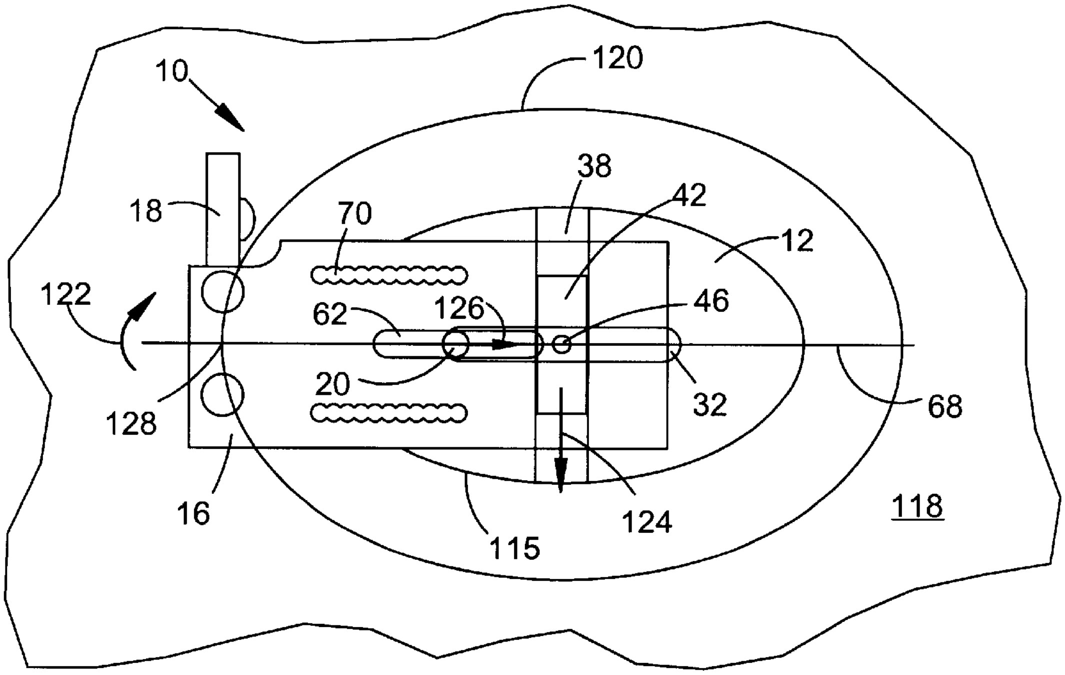
FIG. 11 is a top plan view of the hand-held oval cutting device at a first cutting position.

Operation of the oval cutting device 10 will now be described with respect to FIGS. 11–14, wherein the knob and spacer block are not shown for clarity. In FIG. 11, the cutting device is positioned in an initial cutting position on a sheet of material 118 with the resilient feet 48 in contact with an upper surface of the sheet. The base member 12 is preferably oval-shaped and includes an elliptically-shaped outer periphery 115 that is preferably substantially parallel to an oval 120 (shown in phantom line) to be cut. The shape of the base member 12 greatly facilitates initial placement and alignment of the cutting device 10 on the sheet of material to be cut. The adjusting block 16 can be adjusted to cut an oval 120 of a predetermined dimension, as previously described. As shown in the drawings, the screw 20 is fixed with respect to the slot 62 midway between the ends of the slot 62 to define a medium size oval to be cut. After setting the proper oval size and positioning the device 10 on the sheet 118, the knob 22 is then grasped in one hand by a user and pressed downwardly to maintain the position of the device 10 on the sheet 118. Simultaneously, the knob is rotated in a clockwise direction as shown by arrow 122. During rotation from the FIG. 11 position to the FIG. 12 position, the slider block 42 and pivot pin 46 move in a direction represented by arrow 124 from a central portion of the channel 38 of the base member 12 to a lower end of the channel. Simultaneously, the screw 20 slides in the slot 32 of the base member 12 in a direction represented by arrow 126 from a first end of the slot 32 to a central portion of the slot 32, and simultaneously rotates in the direction 122. The mutual position of the screw 20 and slot 62 do not change during movement since they are fixed together by the knob 22, as is evident from FIGS. 12–14. Thus, the screw 22 functions as a first movable pivot point for the adjusting plate 16 (and attached blade holder 18 and blade 92). Sliding movement of the pivot pin 46 in the channel 38 and simultaneous rotation of the adjusting plate 16 about the pivot pin 46 defines a second movable pivot point about the pivot pin 46. Mutual movement of the first and second pivot points causes elliptical movement of the blade 92 along the path 120. The cutting tip 114 of the blade 92 is preferably located at the intersection 128 of the longitudinal axis 68 and the cutting path 120. The distance between the first and second pivot points is maintained during the elliptical movement. The distance between the pivot points and the cutting tip 114 can be adjusted when not cutting by loosening the knob 22 and locating the registration pins 58 in a different set of bores 72, as previously described.

Figure 12:
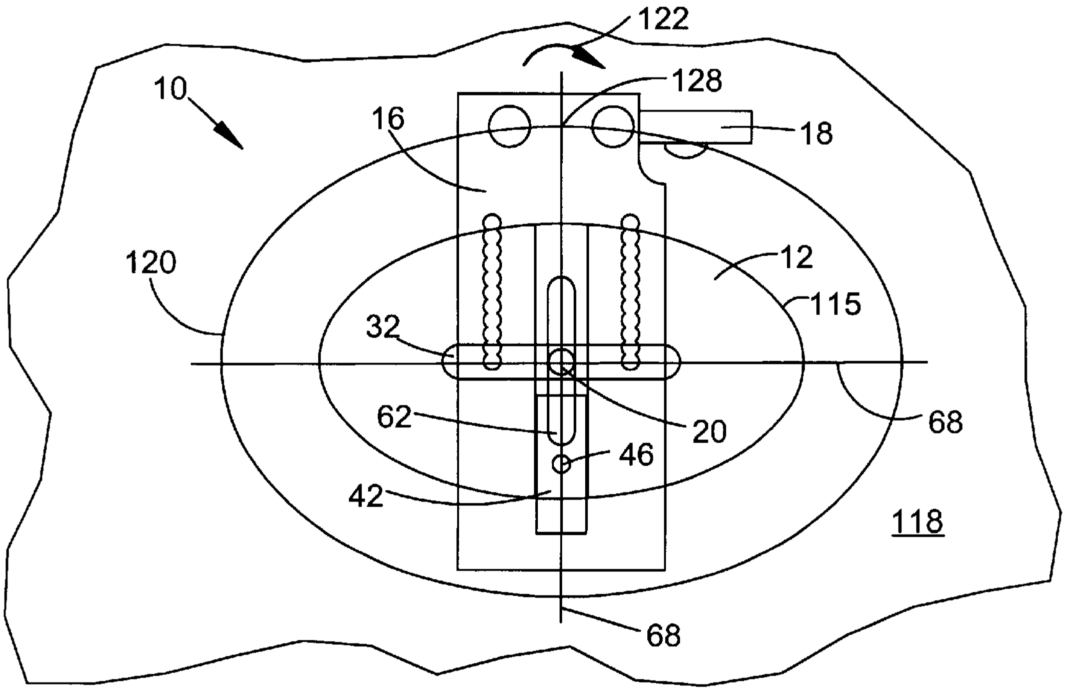
FIG. 12 is a top plan view of the hand-held oval cutting device at a second cutting position.
Figure 13:
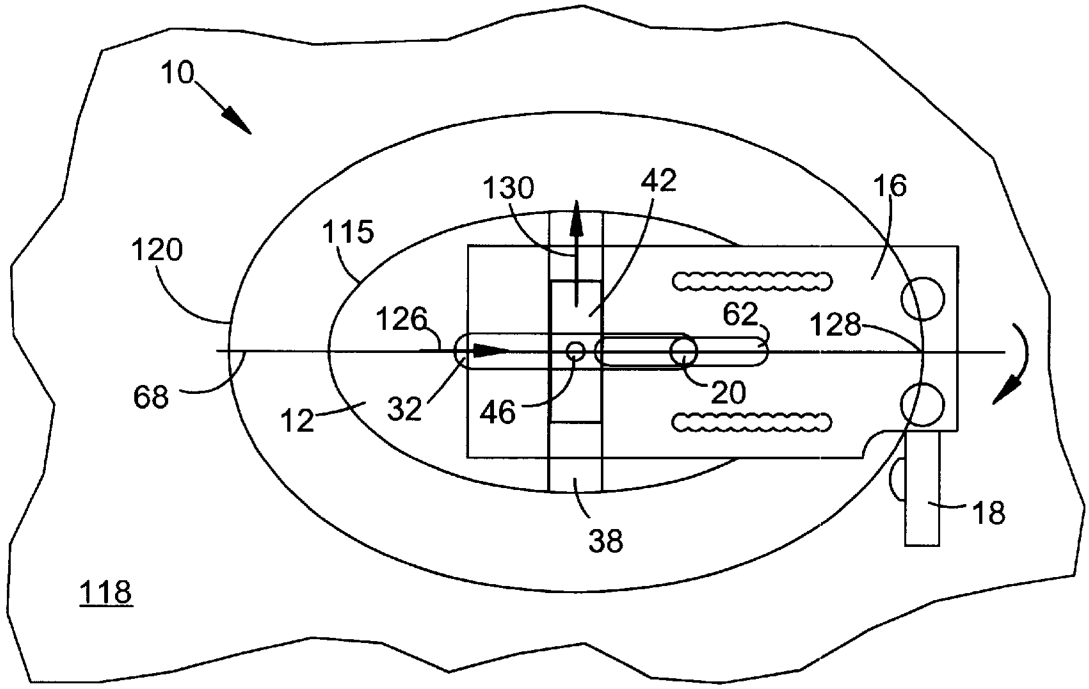
FIG. 13 is a top plan view of the hand-held oval cutting device at a third cutting position.

Continued rotation of the adjusting plate 16 about the pivot pin 46 from the FIG. 12 to the FIG. 13 position causes the slider block 42 and pivot pin 46 to move in a direction represented by arrow 130 from the lower end of the channel position to the central channel portion. Simultaneously, the screw 20 slides in the slot 32 of the base member 12 in the direction 126 from the central slot portion to a second end of the slot opposite the first slot end.

Figure 14:
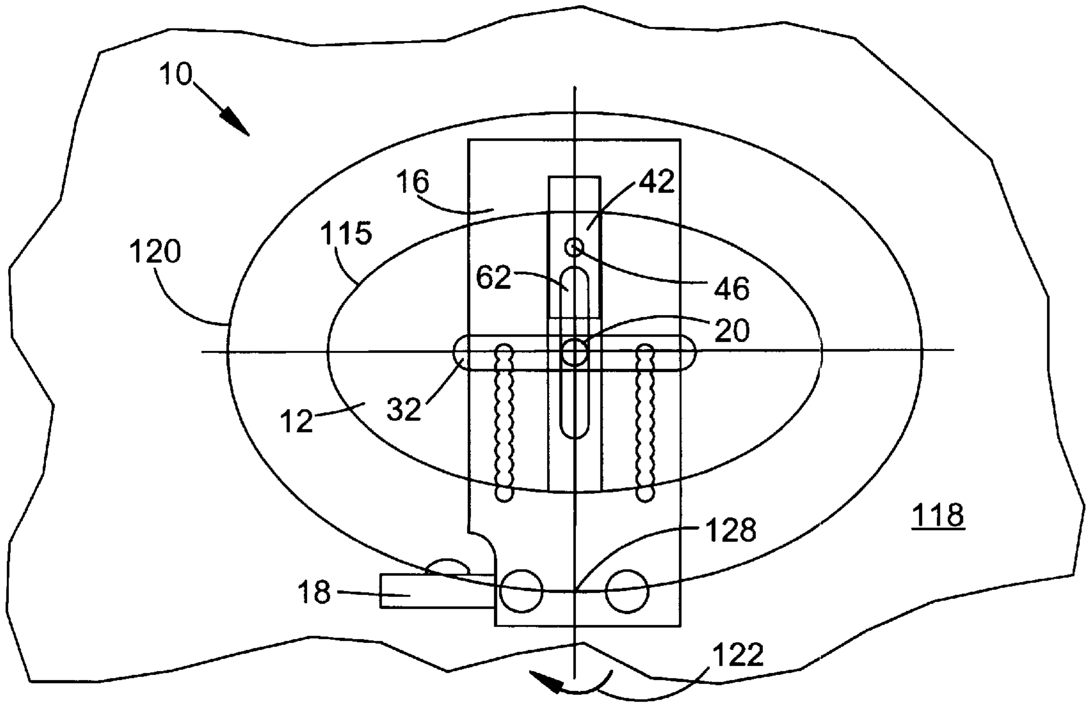
FIG. 14 is a top plan view of the hand-held oval cutting device at a fourth cutting position.

Likewise, continued rotation of the adjusting plate 16 about the pivot pin 46 from the FIG. 13 to the FIG. 14 position causes the slider block 42 and pivot pin 46 to move in the direction 130 from the central channel portion to an upper end of the channel. Simultaneously, the screw 20 slides in the slot 32 of the base member 12 in a direction represented by arrow 132 from the second channel end back to the central channel portion. Continued rotation of the adjusting plate to the FIG. 11 position completes the cut and places the slider block, pivot pin and screw 20 in their original positions. Thus, oval shapes can be cut in a sheet of material through smooth, continuous action from one-handed manipulation of the knob.

Although clockwise rotation of the adjusting plate 16 and blade holder 18 is preferred for right-handed use, the blade 92 can be set for counter clockwise rotation if desired, which is preferable for left-handed use. Moreover, although the cutting device 10 is intended primarily for cutting ovals in photographs, cardboard sheets and the like, the blade holder can be adapted to receive other cutting implements for ceramic, glass, wood, etc., or can be modified to receive standard drawing implements.

While particular embodiments of the invention have been shown, it will be understood that the invention is not limited thereto since modifications may be made by those skilled in the art, particularly in light of the foregoing teachings. For example, the particular oval shape with its present major and minor axes can be changed by adjusting the relative dimensions of one or more of the described components.

I claim:

1. A hand-held device for forming an elliptical shape in a sheet of material, comprising:

a first member adapted for placement on the sheet of material, the first member having a first pivot point that is movable along a first axis;

a second member having a second pivot point that is movable along a second axis substantially perpendicular to the first axis; said first member and said second member being operably connected to each other at said first and second pivot points; and only one knob connected to one of said first and second pivot points, said knob being adapted for grasping by one hand such that rotation of said knob about said one pivot point causes said second member to rotate and slide in an elliptical pattern with respect to said first member.

2. The device of claim 1 wherein a slot is formed in one of said members and an opening is formed in the other of said members; and wherein said one pivot point comprises a fastener extending through the slot in said one member and through the opening in said other member, said knob being mounted to said fastener for holding said first and second members together, wherein rotation of said knob causes substantially linear movement of said fastener along said slot and rotational movement of said other member about said fastener.

3. The device of claim 2 wherein a channel is formed in said one member and extends generally transverse to said slot; and further comprising a slider block positioned in said channel for movement therealong, said second pivot point including a pivot pin operably connected between said slider block and said other member, such that rotation of said knob causes substantially linear movement of said pivot pin along said channel, and rotational movement of said other member about said pivot pin.

4. The device of claim 3 further comprising a forming member coupled to the second member for forming the elliptical shape in the sheet of materials the second member rotates and slides in an elliptical pattern with respect to said first member.

5. The device of claim 4 wherein said adjustment mechanism comprises mutually engageable portions on said second member and said forming member for adjustably fixing said forming member with respect to said second member.

6. The device of claim 5 wherein said mutually engageable portions comprise at least one registration pin mounted on a first of said second member and said forming member and a plurality of bores formed in a linear array on a second of said second member and said forming member for receiving said at least one registration pin, whereby the size of the elliptical shape can be adjusted by positioning the at least one registration pin in a different bore of said plurality of bores.

7. The device of claim 1 further comprising a cutting blade operably connected to said second member and adapted for contacting the sheet of material for cutting an elliptical shape therein as said knob is rotated.

8. The device of claim 1 further comprising an instrument operably connected to said second member and adapted for contacting the sheet of material for forming an elliptical shape as said knob is rotated.

9. The device of claim 8 wherein said first member is a base plate, said base plate comprising an elliptical shape that is substantially parallel to the elliptical shape to be formed to thereby facilitate placement and orientation of said device on the sheet of material.

10. The device of claim 8 wherein said instrument is a cutting member for cutting an elliptical shape in the sheet of material.

11. The device of claim 10 wherein said first member is a base plate, said base plate comprising an elliptical shape that is substantially parallel to the elliptical shape to be cut to thereby facilitate placement and orientation of said device on the sheet of material.

12. The device of claim 10 further comprising a holder connected to said second member, said cutting member being removably mounted to said holder.

13. The device of claim 12 wherein said holder comprises a depression that is shaped to receive a substantial portion of said cutting member, a depth of said depression being at least equal to a thickness of said cutting member.

14. The device of claim 13 further comprising first and second fasteners mounted to said holder, each of said fasteners having a head portion, with the head portion of said first fastener being partially located in the depression such that a space for the cutting member is formed between said head portion and a bottom surface of said depression, and the head portion of said second fastener being entirely located in the depression such that the cutting member can be securely held between the head portion of said second fastener and the bottom surface of said depression.

15. The device of claim 1 further comprising resilient feet mounted to a lower surface of said first member.

16. A hand-held device for forming an elliptical shape in a sheet of material, comprising:

a first plate member adapted for placement on the sheet material, the first plate member having a first pivot point that is movable along a first axis;

a second plate member having a second pivot point that is movable along a second axis substantially perpendicular to the first axis; said first and second plate members being operably connected to each other at said first and second pivot points;

a forming member operably connected to said second plate member for forming the elliptical shape in the sheet of material;

wherein rotation of said second plate member with respect to said first plate member about said movable pivot points causes said forming member to move in an elliptical path; and only one knob connected to one of said first and second pivot points, said knob being adapted for grasping by one hand such that rotation of said knob about said one pivot point causes said forming member to move in the elliptical path.

17. The device of claim 16 wherein an elongated slot is formed in one of said plate members and an opening is formed in the other of said plate members; and wherein said one pivot point comprises an elongate fastener extending through the slot in said one plate member and through the opening in the other plate member, said knob being mounted to said fastener for holding said first and second plate members together, wherein rotation of said knob causes substantially linear movement of said fastener along said slot and rotational movement of said other plate member about said fastener.

18. The device of claim 17 wherein a channel is formed in said one member and extends generally transverse to said slot; and further comprising a slider block positioned in said channel for movement therealong, said second pivot point including a pivot pin operably connected between said slider block and said other plate member, such that rotation of said knob causes substantially linear movement of said pivot pin along said channel and rotational movement of said other plate member about said pivot pin.

19. The device of claim 16 further comprising an adjustment mechanism located between said second plate member and said forming member for adjusting the relative position of said forming member with respect to said second plate member for selectively forming different sizes of elliptical shapes.

20. The device of claim 19 wherein said adjustment mechanism comprises mutually engageable portions on said second plate member and said forming member for adjustably fixing said forming member with respect to said second plate member.

21. The device of claim 20 wherein said mutually engageable portions comprise at least one registration pin mounted on a first of said second plate member and said forming member and a plurality of bores formed in a linear array on a second of said second plate member and said forming member for receiving said at least one registration pin, whereby the size of the elliptical shape can be adjusted by positioning the at least one registration pin in a different bore of said plurality of bores.

22. The device of claim 16 wherein said forming member comprises a cutting blade operably connected to said second plate member and adapted for contacting the sheet of material for cutting an elliptical shape therein as said knob is rotated.

23. The device of claim 22 wherein said first plate member comprising an elliptical shape that is substantially parallel to the elliptical shape to be cut to thereby facilitate placement and orientation of said device on the sheet of material.

24. The device of claim 22 further comprising a holder connected to said second plate member, said cutting blade being removably mounted to said holder.

25. The device of claim 24 wherein said holder comprises a depression that is shaped to receive a substantial portion of said cutting blade, a depth of said depression being at least equal to a thickness of said cutting blade.

26. The device of claim 25 further comprising first and second fasteners mounted to said holder, each of said fasteners having a head portion, with the head portion of said first fastener being partially located in the depression such that a space for receiving the cutting member is formed between said head portion and a bottom surface of said depression, and the head portion of said second fastener being entirely located in the depression such that the cutting member can be securely held between the head portion of said second fastener and the bottom surface of said depression.

27. The device of claim 16 further comprising resilient feet mounted to a lower surface of said first member.

28. The device of claim 16 wherein said first plate member comprising an elliptical shape that is substantially parallel to the elliptical shape to be formed to thereby facilitate placement and orientation of said device on the sheet of material.

29. A hand-held device for cutting an elliptical shape in a sheet of material, comprising:

an elliptical base plate having major and minor axes, said base plate including upper and lower surfaces with an elongate slot extending along one of said axes between said upper and lower surfaces, and a channel formed in said upper surface, said channel extending along the other of said axes;

a plurality of resilient feet attached to the lower surface of said base plate for contacting the sheet of material;

an adjusting plate having upper and lower surfaces with an elongate slot extending therebetween, the lower surface of said adjusting plate comprising at least one linear matrix of bores extending generally parallel to said elongate slot in said adjusting plate;

a spacer block located between said base plate and adjusting plate, said spacer block including a registration pin projecting from an upper surface thereof, said registration pin being installed in one of said bores when said plates and block are connected together;

an elongate fastener having a head portion and a shaft portion, the shaft portion extending through the slot in said base plate, an aperture in said spacer block and said slot in said adjusting plate, with the head portion of said fastener being adjacent said base plate lower surface;

a knob threaded onto a distal end of said shaft portion for holding said base plate, said spacer block and said adjusting plate together, said adjusting plate and spacer block being rotatable about a first movable pivot point defined by a longitudinal axis of said elongate fastener, said adjusting plate together with said spacer, elongate fastener and knob being translatable along said slot in said base plate;

a slider block located in said channel of said base plate and pivotally attached to said spacer block to define a second movable pivot point that is translatable along said channel; and a blade holder connected to an outer end portion of said adjusting plate for receiving a cutting blade, said blade holder having a lower end portion with a depression formed therein, said depression being shaped to receive a substantial portion of the cutting blade, a depth of said depression being at least equal to a thickness of the cutting blade, first and second fasteners mounted to said holder, each of said fasteners having a head portion, with the head portion of said first fastener being partially located in the depression such that a space for receiving the cutting blade is formed between said head portion and a bottom surface of said depression, and the head portion of said second fastener being entirely located in the depression such that the cutting blade can be securely held between the head portion of said second fastener and the bottom surface of said depression;

said knob being adapted for grasping by one hand and rotated about said elongate fastener; such rotation causing said adjusting plate to rotate about and translate with said first and second pivot points to thereby move said cutting blade along said elliptical path, the size of the elliptical path being selectively adjustable by positioning the at least one registration pin in different bores of said matrix of bores.

30. The device of claim 4 further comprising an adjustment mechanism operatively connected between said second member and said forming member for adjusting the position of said forming member with respect to said second member for selectively forming different sizes of elliptical shapes.

* * * * *